United States Patent Office 2,809,948
Patented Oct. 15, 1957

2,809,948

PROCESS FOR PREPARING DISPERSIONS OF HYDROCARBON RESINS AND PRODUCTS OBTAINED THEREBY

Edward Allen Hunter and Augustus Bailey Small, Baton Rouge, La., assignors to Esso Research and Engineering Company, a corporation of Delaware No Drawing. Application August 4, 1955,
Serial No. 526,538

10 Claims. (Cl. 260—28.5)

This invention relates to resin dispersion, and more particularly relates to dispersions of resins prepared from steam-cracked petroleum fractions.

The invention has for one of its objects the provision of aqueous dispersions of hydrocarbon resins of high shelf and mechanical stability.

A further object is to provide petroleum resins in the form of a latex-like dispersion for application as an adhesive, as a saturant or coating for paper or cloth, or as a sizing or binding material in paper pulp.

The preparation of stable resin dispersions requires a careful selection of the emulsifying agent particularly in the preparation of dispersions suitable for application to all types of textile fibers and paper.

According to the present invention, it has been found that cationic surface active agents in admixture with non-ionic surface active agents are particularly valuable for preparing stable aqueous resin dispersions.

Cationic latices of petroleum resins, although they have not been successfully formulated previously, have certain inherent advantages. For example, when adding to paper pulp to provide internal sizing, a properly formulated cationic resin latex will, due to its inherent charge, discharge its micelles onto the paper fibers without the necessity of adding alum or other polyvalent electrolyte as must be done with conventional anionic latices. In the absence of the otherwise required polyvalent electrolytes the cationic latices are stable to relatively high pH values (10 or higher), permitting their use in alkaline media, where anionic latices are unstable in the presence of these electrolytes.

Hydrocarbon resins to which the present invention is applicable are made from petroleum cracked distillates boiling in the range of about 30° C. to 280° C. or any fraction boiling within this range. The resins are prepared by treating the distillate with 0.25–2.5% of a Friedel-Crafts type catalyst such as aluminum chloride, aluminum bromide, boron trifluoride, and the like or solutions, slurries, or complexes thereof. The reactions are conducted at temperatures in the range of 0–65° C., and preferably 10–54° C. Residual catalyst is quenched by suitable methods such as addition of methyl alcohol and subsequent filtration, water and/or caustic washing. The final solution is then stripped of unreacted hydrocarbons and low molecular weight oils by vacuum or steam distillation.

In place of the petroleum cracked distillates, the feed to polymerization may consist of mixtures of a diolefin with an olefin. Sufficient diolefin must be present and incorporated in the polymer to give a resin instead of an oil.

The non-ionic surface active agents found attractive for the present invention include the polyoxyalkenated alkyl phenols or alcohols having the formula

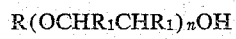

where R is an alkyl, aryl or alkaryl group, $R_1$ is an alkyl group or hydrogen and $n$ is an integer of 4 to 8 to 10 or even higher. These compounds are prepared by condensing an alkyl phenol or an alcohol with an alkylene oxide such as ethylene or propylene oxide.

Commercial compounds which have been found useful in connection with the present invention include certain of the polyoxyethylated alkyl phenols, such as Triton X-100 (octyl phenoxy polyethoxy ethanol containing about 8 to 10 ethylene oxide units) and Triton X-45 (same as Triton X-100 but containing only about 5 ethylene oxide units), sold by Rohm & Haas. The above-described phenols may also be supplemented with sorbitan trioleate sold by Atlas Powder Co. as "Span 85."

The cationic emulsifying agents found particularly useful in connection with this invention are the fatty amine-ethylene oxide condensation products having the following formula:

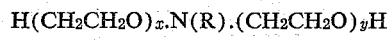

where $x+y=2–10$ and R is an aliphatic hydrocarbon radical having 10 to 20 carbon atoms. A specific emulsifier of this group is Ethomeen S-12 where R is an unsaturated aliphatic hydrocarbon group having 18 carbon atoms derived from soya oil and $x+y$ is 2.

The polyoxyalkylated phenols are added in amounts of 1 to 5 wt. percent based on resin; the sorbitan trioleate in amounts between 1 and 3 wt. percent based on resin; the fatty amine-ethylene oxide condensation product in amounts between 5 and 15%, based on resin, the quaternary ammonium salts in amounts between 1 and 5 wt. percent based on resin; and the poly-alkyl amides in amounts between 1 and 5 wt. percent based on resin.

It is generally found desirable to supplement the amines above described with other cationic agents. These include the quaternary ammonium salts e. g. the alkyl trimethyl ammonium salts such as dodecyl trimethyl ammonium chloride and octadecyltrimethyl ammonium chloride and a poly-alkyl amide of a higher fatty acid, e. g. Nopcogen 14–L (condensation product of ethylene oxide and lauric acid amide). The emulsifiers are added to the molten resin and an amount of water (60–85% by weight on the resin) is slowly added to form a water-in-oil type emulsion. The remainder of the water is added rapidly to give about 50% total solids in the product whereupon the emulsion inverts forming an oil-in-water type emulsion. Without wishing to limit this invention by any theories of action, it is believed that the following description outlines the behavior and activity of the various surfactants. The amine-ethylene oxide condensation product as well as the mixture with alkyl trimethyl ammonium salt imparts the cationic quality to the emulsion as well as promoting inversion while the sorbitan trioleate stabilizes the initial water-in-oil emulsion and the non-ionic emulsifier stabilizes the final oil-in-water emulsion. The poly fatty acid amide promotes inversion to the desired oil-in-water emulsion. It is apparent that this method is especially suited to the preparation of emulsions at atmospheric pressure from resins having a softening point below 100° C., that is, below the boiling point of water. However, by blending a resin having a softening point of 100° C. or more with 10–25% paraffin wax based on the resin, the emulsification can be carried out as above described provided that the cationic emulsifier consists of a mixture of the fatty amine-ethylene oxide condensation product and the alkyl trimethyl ammonium salt.

Paper, cardboard, and other fibrous materials of this type may be coated and/or impregnated by means of the aqueous hydrocarbon resin emulsion in order to improve the gloss and finish of the material, as well as to improve its resistance to blocking and scuffing, ultraviolet light discoloration and heat discoloration, and to impart certain moisture and grease resisting properties to the material. Paper and fibrous materials of this type which have been treated with aqueous hydrocarbon resin emulsions under conditions designed to form a continuous coating film have a smooth, glossy appearance and can be used in various applications in which a decorative paper is desired. By incorporating various dyes, coloring bodies, pigments, decorative pigments, fillers, and the like in the aqueous resin emulsions, decorative papers of almost any desired color, texture, and appearance may be prepared at will.

A major outlet for paper, cardboard, and fibrous materials in general which have been coated with an aqueous hydrocarbon resin emulsion, followed by the removal of all volatile material, is in the preparation of packages and containers of various kinds. Paper stock coated in this manner is ideally suited for this purpose, as it can be impregnated sufficiently to impart almost any desired mechanical strength to the finished container. In addition, the coating is sufficiently moisture resistant, particularly if the dispersed particles have been welded by the application of heat or by the use of solvents, or otherwise, to protect the contents of the container from contamination by external moisture or liquids in general. Moisture proof containers of almost any desired size and shape may be readily fabricated from such coated materials.

In addition, containers designed to hold certain liquid or liquid-containing products may be readily fabricated from such coated paper, cardboard, or fiber stock. Examples of such containers are milk bottles, soft-drink bottles, and containers for similar products. Hydrocarbon resins are ideally suited for this purpose as they do not impart any odor or taste to the liquid or liquid-containing products in the containers.

It is, of course, to be understood that paper containers and packages may be coated with butadiene resin emulsions after fabrication.

For coating the usual size and type of paper stock, it has been found that coating weights of 3 to 10 ounces per ream is sufficient for ordinary purposes.

In addition to uncoated and unfilled paper stock, paper stock which has been coated or filled first with other materials, such as casein-clay coated stock, may be used for this purpose.

Laminated paper or fiber products also can be prepared in a similar manner, the coated sheets being united either before or after the volatile materials have been removed from the coated surface. A particularly desirable procedure comprises coating a plurality of sheets, running the sheets separately through suitable drying ovens, and uniting the sheets immediately upon emerging from the drying ovens, at which point the coated surface is in a plastic condition. The multi-layered stock then is run through suitable rollers in order to thoroughly bond the constituent units together. An alternative procedure comprises heating the multi-layered stock in platens under suitable pressure. Such bonded or laminated products are eminently suited to the production of the containers previously referred to.

The process may be further illustrated by the following examples but without intent to limit the invention thereto.

*Example I*

350 g. of 70° C. softening point hydrocarbon resin prepared from steam-cracked petroleum streams was heated to 95° C. and to this was added a mixture of 30 g. of Ethomeen S–12, 10 g. of dodecyltrimethyl ammonium chloride and 10 g. of an octyl phenoxy polyethoxy ethanol containing about 5 ethylene oxide units. 50 cc. of hot water was then added with mild agitation which was continued for about 30 minutes before more water was added. At the end of the half hour, 250 cc. of hot water (95–99° C.) was added very slowly to the mixture, forming a water-in-resin emulsion. Following this, 100 cc. hot water was added rapidly with continued agitation causing the system to invert to a resin-in-water emulsion. After cooling to 60° C., 20 parts of the latex were diluted with 80 parts of water to give a 10 wt. percent solids latex. After standing one week, there was no observable change. After two weeks a slight film had formed on the surface but the underlying liquid appeared homogeneous. This indicates excellent shelf stability since one week standing at 10% solids is equivalent to one year at 50% solids.

Visual observation through a microscope at 400 diameters showed the particle size of the latex to be mostly below one micron. A thin cast and dried film on a glass plate showed good cohesion and adhesion properties. After thorough drying, rewetting of the film did not cause cracking or blooming.

An evaluation of this same latex by an independent agency revealed the following results:

| | |
|---|---|
| Particle size (microns) | 0.5–2. |
| Mechanical stability | >10 min. |
| Shelf stability | >7 days. |
| pH stability | <2–>10. |
| Film | Clear, tough. |

The mechanical stability was determined by break down in a Waring blender and a latex which will withstand 10 minutes or more of this action is considered very good. This formulation is considered the best because of its excellent stability. Substituting Triton X–100 for the Triton X–45 gives a latex having substantially the same stability characteristics.

*Example II*

350 g. of a 70° C. softening point resin was heated to 132° C. and cooled to 96° C. in water bath.

A mixture of 10 g. sorbitan trioleate, 20 g. Nopcogen 14–L, 15 g. of an octyl phenoxy polyethoxy ethanol containing 8 to 10 ethylene oxide units (Triton X–100) and 10 g. Ethomeen S–12 was blended in with agitation. 12½% or 50 cc. hot water (based on solids) was mixed in the resultaing water-in-oil emulsion for 30 minutes while continuing the agitation.

Another 62½% hot water (250 cc.) was then blended in, followed by 25% hot water (100 cc.) added rapidly producing smooth inversion to oil-in-water latex. The resulting emulsion was cooled to yield a cationic latex, containing 50% solids by weight.

20 parts of latex were diluted with 80 parts water to 10% solids and allowed to stand in a graduate for two weeks. No signs of phase separation or creaming were observed. This indicates excellent shelf stability, since one week standing for a 10% latex is equivalent to one year for a 50% latex as prepared.

A sample of the latex was diluted with distilled water to about 0.1% solids and was examined under the microscope by transmitted light. The particles were discrete with no signs of agglomeration or uninverted material. The particles were predominantly in the size range of one micron or less diameter, as required for paper sizing applications.

A thin layer cast on a clean glass plate formed a good cohesive, adhesive, glossy, transparent, rather pliant film. After drying the film thoroughly, application of a drop of water did not cause cracking or blooming.

A separate evaluation by an independent agency revealed the following results.

| | |
|---|---|
| Particle size (microns) | 1–3. |
| Mechanical stability | >10 min. (Waring blender). |
| Shelf stability | >7 days. |
| pH stability | <2–>10. |
| Film | Clear, fairly tough. |

*Example III*

350 g. petroleum resin of 70° C. softening point was heated to 132° C. and then cooled to 96° C. in a water bath.

The following mixture was then blended in: 30 g. Ethomeen S-12, 10 g. octadecyltrimethyl ammonium chloride, 10 g. octyl phenoxy polyethoxy ethanol containing about 5 ethylene oxide units (Triton X-45). 50 cc. hot water was blended in slowly and mixture agitated for 30 minutes, followed by 250 cc. hot water slowly and 200 cc. hot water rapidly.

The resulting product was a latex containing about 40 wt. percent resin.

Under a microscope, the individual micelles were even finer than those of Example I, being essentially all less than 1 micron in diameter.

A 10% latex prepared by diluting the above showed no signs of instability in seven days, indicating good shelf stability.

A film cast on glass was very glossy, transparent, adhesive, pliable and water resistant.

*Example IV*

A mixture of 80 wt. percent 100° C. softening point petroleum resin and 20 wt. percent paraffin wax was heated to 132° C. and cooled to 96° C. on water bath. The following mixture was then blended in: 30 g. Ethomeen S-12, 10 g. dodecyl-trimethyl ammonium chloride and 10 g. octyl phenoxy polyethoxy ethanol containing about 5 ethylene oxide units (Triton X-45). 50 cc. hot water (96° C.) was then blended in and the paste agitated for 30 minutes, followed by the slow addition of 250 cc. hot water and the rapid addition of 200 cc. hot water. The mixture was cooled to yield a stable aqueous latex containing 40 wt. percent of resin-wax mixture.

On examination, this latex showed good dispersion (about 1 micron) and film forming properties.

*Example V*

When the mixture of resin and paraffin wax of Example IV was emulsified in accordance with the recipe of Example II, the latex failed completely, indicating the uniqueness of the recipe of Example IV with respect to the resin-wax blend.

*Example VI*

The following recipes formulated in accordance with the procedure of Example I did not invert, thus revealing the uniqueness of the combination claimed by this invention. Most of the products solidified upon cooling:

|   |   | Weight percent on resin |
|---|---|---|
| (1) | 350 g. 70° C. resin | – |
|   | 30 g. dodecyl trimethyl ammonium chloride | 8.5 |
|   | 10 g. Nopcogen 14-L | 2.9 |
| (2) | 350 g. 70° C. resin | – |
|   | 20 g. Ethomeen S-12 | 5.7 |
|   | 20 g. Nopcogen 14-L | 5.7 |
|   | 10 g. Alkaterge (substituted oxazoline, cationic) | 2.9 |
| (3) | 350 g. 70° C. resin | – |
|   | 10 g. Span 85 | 2.9 |
|   | 15 g. Triton X-100 | 4.3 |
|   | 20 g. Nopcogen 14-L | 5.7 |
|   | 10 g. Hyamine 10X (diisobutyl cresoxy ethoxy ethyl dimethyl benzyl ammonium chloride, cationic) | 2.9 |
| (4) | 350 g. 70° C. resin | – |
|   | 10 g. Span 85 | 2.9 |
|   | 20 g. Nopcogen 14-L | 5.7 |
|   | 10 g. Hyamine 10X | 2.9 |
|   | 10 g. Ethomeen S-12 | 2.9 |
| (5) | 350 g. 70° C. resin | – |
|   | 10 g. Span 85 | 2.9 |
|   | 20 g. Ethomeen S-12 | 5.7 |
|   | 20 g. Pluronics L-44 (alkenyl oxide-glycol condensation product, non-ionic | 5.7 |
| (6) | 350 g. 70° C. resin | – |
|   | 10 g. Span 85 | 2.9 |
|   | 20 g. Ethomeen S-12 | 5.7 |
|   | 10 g. Triton X-100 | 2.9 |
|   | 10 g. Antarox A-200 (alkyl phenoxy, polyethylene glycol, non-ionic | 2.9 |

The nature of the present invention having been thus fully set forth and specific examples of the same given, what is claimed as new and useful and desired to be secured by Letters Patent is:

1. The method for preparing an aqueous dispersion of steam-cracked petroleum resins which comprises mixing with said resin at a temperature below the boiling point of water and above the melting point of the resin a mixture of 1 to 5 wt. percent based on the resin of an octyl phenoxy polyethoxy ethanol containing 5 to 10 ethylene oxide units and 5 to 15 wt. percent based on the resin of a condensation product of a fatty amine and ethylene oxide having the formula

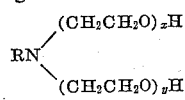

where R is an aliphatic hydrocarbon radical having 10 to 20 carbon atoms and x and y are integers whose sum is from 2 to 10, and adding water until an inversion of phases takes place.

2. The emulsion prepared in accordance with claim 1.

3. Process according to claim 1 in which the octyl phenoxy polyethoxy ethanol contains 8 to 10 ethylene oxide units, R is 18 and x+y is 2 and in which there is additionally present 1 to 3 wt. percent based on the resin of sorbitan trioleate and a 1 to 5 wt. percent based on the resin of a poly-alkyl amide of a higher fatty acid.

4. The emulsion prepared in accordance with claim 3.

5. The method according to claim 1 in which the octyl phenoxy polyethoxy ethanol contains about 5 ethylene oxide units and in which 1 to 5 wt. percent based on the resin of an alkyl trimethyl ammonium salt is additionally present.

6. The emulsion prepared in accordance with claim 5.

7. Process according to claim 5 in which the alkyl trimethyl ammonium salt is dodecyl trimethyl ammonium chloride.

8. Process according to claim 5 in which the alkyl trimethyl ammonium salt is octadecyl trimethyl ammonium chloride.

9. Process for preparing an aqueous dispersion of a steam-cracked petroleum resin having a softening point of at least 100° C. which comprises mixing the resin with paraffin wax and then mixing the blend at atmospheric pressure and at a temperature below the boiling point of water and above the melting point of the resin-wax blend with an octyl phenoxy polyethoxy ethanol containing about five ethylene oxide units, a condensation product of a fatty amine and ethylene oxide having the formula

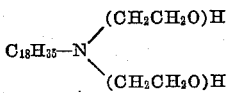

and dodecyl trimethyl ammonium chloride and adding water until an inversion of phases takes place.

10. The emulsion prepared in accordance with claim 9.

References Cited in the file of this patent

UNITED STATES PATENTS

| 1,948,442 | Ellis | Feb. 20, 1934 |
| 2,536,018 | Schoenholz et al. | Jan. 2, 1951 |